(12) United States Patent
Hori et al.

(10) Patent No.: US 8,637,210 B2
(45) Date of Patent: Jan. 28, 2014

(54) MEMBRANE-ELECTRODE ASSEMBLY, METHOD OF PRODUCING THE ASSEMBLY, AND SOLID POLYMER-TYPE FUEL CELL EMPLOYING THE SAME

(75) Inventors: Yoshihiro Hori, Nissin (JP); Yoshito Endo, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 499 days.

(21) Appl. No.: 13/055,016

(22) PCT Filed: Jul. 21, 2009

(86) PCT No.: PCT/IB2009/006300
§ 371 (c)(1),
(2), (4) Date: Jan. 20, 2011

(87) PCT Pub. No.: WO2010/010440
PCT Pub. Date: Jan. 28, 2010

(65) Prior Publication Data
US 2011/0123910 A1 May 26, 2011

(30) Foreign Application Priority Data
Jul. 22, 2008 (JP) .................................. 2008-188998

(51) Int. Cl.
*H01M 8/00* (2006.01)
(52) U.S. Cl.
USPC ........... 429/535; 429/483; 429/482; 429/507; 429/508
(58) Field of Classification Search
USPC ......... 429/535, 479, 482, 483, 480, 481, 507, 429/508
IPC ..................................................... H01M 8/00
See application file for complete search history.

(56) References Cited

U.S. PATENT DOCUMENTS

| | | |
|---|---|---|
| 6,641,862 B1 | 11/2003 | Grot |
| 2006/0046121 A1 | 3/2006 | Shimohira et al. |
| 2006/0078781 A1 | 4/2006 | Stegink et al. |

FOREIGN PATENT DOCUMENTS

| | | |
|---|---|---|
| JP | 04-264367 | 9/1992 |
| JP | 2002-208414 | 7/2002 |
| JP | 2004-200063 | 7/2004 |

(Continued)

OTHER PUBLICATIONS

International Search Report in International Application No. PCT/IB2009/006300; Mailing Date: Oct. 23, 2009.

(Continued)

*Primary Examiner* — Basia Ridley
*Assistant Examiner* — Heng Chan
(74) *Attorney, Agent, or Firm* — Finnegan, Henderson, Farabow, Garrett & Dunner, LLP

(57) ABSTRACT

A first layered article (14a) in which a first electrolyte membrane (12a) and an anode-side catalyst layer (13a) are laminated, and a second layered article (14b) in which a second electrolyte membrane (12b) and a cathode-side catalyst layer (13b) are laminated, are formed. Then, the first layered article (14a) and the second layered article (14b) are disposed so that the electrolyte membrane-side surfaces of the two articles face each other. A reinforcement frame (20) is then disposed between the two articles. The whole layered assembly in this state is thermocompression-bonded. Thus, a membrane-electrode assembly (15) in which the reinforcement frame (20) is embedded within an electrolyte membrane (15) that is formed by the fusion of first electrolyte membrane (12a) and the second electrolyte membrane (12b) is obtained.

1 Claim, 4 Drawing Sheets

(56) References Cited

FOREIGN PATENT DOCUMENTS

| JP | 2004-523063 | 7/2004 |
| JP | 2006-100266 | 4/2006 |
| JP | 2007-109576 | 4/2007 |
| JP | 2007-242637 | 9/2007 |
| JP | 2008-130416 | 6/2008 |

OTHER PUBLICATIONS

Written Opinion of the International Searching Authority in International Application No. PCT/IB2009/006300; Mailing Date: Oct. 23, 2009.

Notification of Reason(s) for Refusal in Japanese Patent Application No. 2008-188998; Drafting Date: Nov. 19, 2010.

MEMBRANE-ELECTRODE ASSEMBLY, METHOD OF PRODUCING THE ASSEMBLY, AND SOLID POLYMER-TYPE FUEL CELL EMPLOYING THE SAME

BACKGROUND OF THE INVENTION

1. Field of the Invention

The invention relates to a membrane-electrode assembly, and a method of producing the membrane-electrode assembly, and a solid polymer-type fuel cell employing the assembly.

2. Description of the Related Art

A solid polymer-type fuel cell is an example of a conventional fuel cell. FIG. 6 shows an example of the solid polymer-type fuel cell. A solid polymer-type fuel cell 10 includes a membrane-electrode assembly (MEA) 4 in which an anode catalyst layer 2a and a cathodes catalyst layer 2b are layered respectively on opposite sides of an electrolyte membrane 1, and diffusion layers 3, 3 are layered on outer sides of the catalyst layers. Separators 6, 6 each having a gas channel 5 are disposed on opposite sides of the membrane-electrode assembly 4, thus sandwiching the assembly 4.

The electrolyte membrane 1 constituting the membrane-electrode assembly 4 usually has a membrane thickness of about 10 to 30 µm, and thus is weak in terms of strength, and not easy to handle. Therefore, when the membrane-electrode assembly 4 is produced, it is a usual practice to provide a reinforcement frame or a protective layer for reinforcement on an outer peripheral portion of the electrolyte membrane 1. Such a reinforcement frame or a protective layer also performs the function of preventing short-circuit from occurring in a peripheral edge portion of the membrane-electrode assembly 4 due to cross-leak of gas at the time of power generation. Japanese Patent Application Publication No. 2007-109576 (JP-A-2007-109576) describes a membrane-electrode assembly that includes such a reinforcement frame or a protective layer. In this document, the area of the flat surface portion of the electrolyte membrane is a size larger than the area of the flat surface portion of each of the anode-side and cathode-side catalyst layers. A reinforcement frame made up of a thermosetting resin is disposed on regions in the two surfaces of the electrolyte membrane in which the catalyst layers are not formed, and protective layers are provided on portions of the spaces between the electrolyte membrane and the reinforcement frame.

As in the membrane-electrode assembly described in Japanese Patent Application Publication No. 2007-109576 (JP-A-2007-109576), the protective layers and the reinforcement frame formed for the purpose of prevention of short-circuit and reinforcement of the electrolyte membrane in the membrane-electrode assembly are formed by layering on the electrolyte membrane in regions in the electrolyte membrane where no catalyst layer is formed. When this type of membrane-electrode assembly is produced, it is necessary to accurately position the anode-side and cathode-side catalyst layers relative to the electrolyte membrane and accurately position the reinforcement frame and the protective layers relative to the catalyst layer.

A reason for the need for the accurate positioning is that if there is a positional deviation of any one of the foregoing members, there may occur a site where a catalyst layer partially overlaps with the reinforcement layer or a protective layer, or there may occur a site in the electricity generation region where the electrolyte membrane is not covered with a catalyst layer. In the case where the former site occurs, inconvenience may possibly result when a diffusion layer or the like is layered on top of the site, or in the case where the latter site occurs, local ion conduction may possibly occur, causing partial degradation of the electrolyte membrane. Therefore, the production of the membrane-electrode assembly requires careful operations.

SUMMARY OF THE INVENTION

In a type of membrane-electrode assembly that has a reinforcement frame and protective layers that are formed on outer peripheral portions of the electrolyte membrane for the purpose of reinforcement of the electrolyte membrane and prevention of short-circuit, the invention provides a membrane-electrode assembly that allows relaxation of the accuracy requirement in positioning the various members during the production processes and thus facilitates the production process as a whole, and also provides a production method for the membrane-electrode assembly as well as a solid polymer-type fuel cell that employs the membrane-electrode assembly.

A first aspect of the invention relates to a membrane-electrode assembly that has at least a construction in which an anode-side catalyst layer and a cathode-side catalyst layer are layered on two opposite side surfaces of an electrolyte membrane, and in which an outer peripheral portion of the electrolyte membrane is provided with a reinforcement frame for reinforcement and for prevention of short-circuit. The reinforcement frame is embedded within the electrolyte membrane.

The foregoing membrane-electrode assembly can deliver its expected electricity generation performance if the reinforcement frame is embedded within the electrolyte membrane, and the anode-side and cathode-side catalyst layers are layered on the electrolyte membrane so that outer edges of the two catalyst layers overlap with a region in which the embedded reinforcement frame is positioned. That is, the positioning accuracy requirement of the catalyst layers can be relaxed by the amount of the width region in a planar direction of each of the four sides of the embedded reinforcement frame. Besides, the inconvenience of the reinforcement frame overlapping with another member will be avoided even if a positional deviation to a certain amount or extent occurs during the layering.

Furthermore, since ion conduction is less likely to occur on the reinforcement frame, local ion conduction does not occur even if the anode-side catalyst layer and the cathode-side catalyst layer are at positions that are no aligned in the thickness direction of the electrolyte membranes. Therefore, local degradation of the electrolyte membranes is also less likely to occur. In this respect, too, it becomes possible to relax the positioning accuracy requirement of the catalyst layers, and the functions as the reinforcement frame can also be heightened.

Furthermore, in the case where the reinforcement frame is layered on an electrolyte membrane, it becomes necessary to dispose two reinforcement frames on two opposite surfaces of an electrolyte membrane in order to prevent cross-leak of gas that is caused by small penetration holes that are likely to occur when a carbon-fiber diffusion layer is compression bonded. However, in the membrane-electrode assembly according to the invention, since the reinforcement frame is embedded within the electrolyte membrane, the intended object can be achieved by disposing merely one sheet of reinforcement frame, and the production cost is reduced. The intended object can be achieved by disposing merely one sheet of reinforcement frame in a construction in which the reinforcement frame is disposed, extending along the outer peripheral edge of the electrolyte membrane, so that the reinforcement frame bears the compression bonding force of the diffusion layer. In this case, however, since a reinforcement frame that is thicker than the electrolyte membrane is needed, this construction inevitably becomes higher in cost than the membrane-electrode assembly according to the invention.

The membrane-electrode assembly according to the invention can be produced by a method as follows.

A first production method (a second aspect of the invention) is a production method that includes at least the steps of: forming a first layered article in which a first electrolyte membrane and an anode-side catalyst layer are layered, and a second layered article in which a second electrolyte membrane and a cathode-side catalyst layer are layered; disposing the first layered article and the second layered article so that an electrolyte membrane side of the first layered article and an electrolyte membrane side of the second layered article face each other; and disposing the reinforcement frame between the first layered article and the second layered article that faces each other, and then thermocompression-bonding the first layered article, the reinforcement frame, and the second layered article so that the reinforcement frame is embedded within the electrolyte membrane that is formed by the first electrolyte membrane and the second electrolyte membrane being fused and integrated together.

A second production method (a third aspect of the invention) is a production method that includes at least the steps of: forming a first layered article in which a first electrolyte membrane and an anode-side catalyst layer are layered, and a second layered article in which a second electrolyte membrane and a cathode-side catalyst layer are layered; layering the reinforcement frame on an electrolyte membrane-side surface of one of the first layered article and the second layered article integrally with the electrolyte membrane-side surface; disposing the first layered article and the second layered article so that the electrolyte membrane-side surface of the first layered article and the electrolyte membrane-side surface of the second layered article face each other; and thermocompression-bonding the first layered article and the second layered article so that the reinforcement frame is embedded within the electrolyte membrane that is formed by the first electrolyte membrane and the second electrolyte membrane being fused and integrated together.

In each of the foregoing production methods, it is desirable that the thickness of the first electrolyte membrane and the second electrolyte membrane be half the thickness of the electrolyte membrane that constitutes the membrane-electrode assembly. However, the thicknesses of the first and second electrolyte membranes may also be different from each other on condition that the total thickness thereof be fixed.

The first layered article and the second layered article can be formed by arbitral method. In a preferred embodiment, the first layered article and the second layered article are formed on conveyance sheets. In that case, the first layered article and the second layered article are formed by peeling from a conveyance sheet a laminate that is formed on the conveyance sheet by applying an electrolyte membrane-forming resin and a catalyst layer-forming resin to the conveyance sheet. The sequence of layering on the conveyance sheet may be a sequence in which the catalyst layer-forming resin is layered on top of the electrolyte membrane-forming resin, or may also be a sequence opposite to that sequence. In the former sequence, after the laminates are peeled off from the conveyance sheets, the reinforcement frame is disposed between the first layered article and the second layered article disposed so that their electrolyte membrane-side surfaces face each other, and then the two laminates are thermocompression-bonded.

In the latter sequence, the same processing as in the former sequence may also be performed. Or, the first layered article and the second layered article both remaining attached to the conveyance sheets may be disposed so as to face each other, and a reinforcement frame may be disposed between the two layered articles, and then layered articles are thermocompression-bonded. In this case, using the conveyance sheets as connection materials, laminates in each of which catalyst layers are layered on both surfaces of an electrolyte membrane (which are termed the catalyst coated membranes (CCMs)) can be continually produced. In this case, the conveyance sheets are peeled off after the thermocompression bonding is performed. Besides, in either one of the foregoing sequences, the step of laminating the reinforcement on the electrolyte membrane-side surface of one of the first layered article and the second layered article integrally with the electrolyte membrane-side surface may be performed, and after that, a process of integrating the first layered article and the second layered article by thermocompression bonding may be performed. In any one of the foregoing cases, a membrane-electrode assembly is formed by layering diffusion layers on the catalyst layers.

The foregoing step of layering the reinforcement frame on the electrolyte membrane-side surface of one of the first layered article and the second layered article integrally with the electrolyte membrane-side surface may also be carried out by leaving a portion of the conveyance sheet as a reinforcement frame on the electrolyte membrane-side surface when the laminate is peeled off from the conveyance sheet. In this production, the step of disposing the reinforcement frame between the first layered article and the second layered article can be omitted.

In the invention, the electrolyte resin that constitutes the electrolyte membrane may be an electrolyte resin that is generally used in solid polymer-type fuel cells. For example, a perfluoro-based electrolyte resin can be preferably used. Besides, electrolyte resins whose macromolecular chain terminal is —$SO_3H$, and electrolyte resins whose macromolecular chain terminal is —$SO_2F$ may also be used. Due to excellent thermal stability, the electrolyte resin whose macromolecular chain terminal is —$SO_2F$ is more preferable. In the case where this resin is used, a process of causing the membrane-electrode assembly to have an ion conductivity by performing thereon a hydrolysis process.

The material of the catalyst layers may be a material that is generally used in solid polymer-type fuel cells. For example, a catalyst admixture containing the foregoing electrolyte resin and a catalyst-carrying electroconductive material. The catalyst used herein is mainly a platinum-based metal, and the electroconductive material that carries the catalysts is mainly a carbon powder. However, this is not restrictive.

The reinforcement frame is a frame for providing the electrolyte membrane with a mechanical strength, and for heightening the gas sealing characteristic of an outer peripheral portion of the electrolyte membrane (prevents short-circuit). As a material of the reinforcement frame, a resin material that does not have ionic conductivity is preferably used. The thickness of the reinforcement frame may be about 5 to 30 μm. Preferably, the reinforcement frame is a resin film having such a thickness as to be embedded within the electrolyte membrane employed in the membrane-electrode assembly. The material of the resin film can be polytetrafluoroethylene, a tetrafluoroethylene-hexafluoropropylene copolymer, tetrafluoroethylene-perfluoroalkoxy ethylene copolymer, tetrafluoroethylene-ethylene copolymer, polyethylene, polyethylene naphthalate, polypropylene, polyether amide, polyether imide, polyether ketone, polyether ether ketone, polysulfone, polyether sulfone, polyphenylene sulfide, polyphenylene oxide, polyphosphazene, polyimide, polyimide amide, etc.

It is preferable that the reinforcement frame be subjected to a surface processing because the characteristic of adhesion to the electrolyte resin is heightened. The method for surface processing is not particularly limited, but, a chemical etching process, a corona discharge process, a plasma surface process, etc. can be mentioned as examples.

The conveyance sheet may be the same as the resin film that forms the reinforcement frame, and may be a conveyance sheet that is generally used in a production process of membrane-electrode assemblies. Examples of the conveyance sheet include polyester-based films (e.g., films of polyethylene terephthalate, polyethylene naphthalate, etc.), polyimide-based films, etc.

When the conveyance sheet is used, it is preferable to apply an electrolyte resin solution or a catalyst layer-forming resin solution by a known method in order to form an electrolyte membrane and a catalyst layer on the conveyance sheet. The applying method is not particularly limited, and examples of the method include typical methods, such as methods that use a knife coater, a bar coater, a spray, a dip coater, a spin coater, a roll coater, a die coater, or a curtain coater, as well as screen printing method, and so on.

According to the invention, in a type of membrane-electrode assembly that has a reinforcement frame in an outer peripheral portion of an electrolyte membrane for the purpose of reinforcing the electrolyte membrane and for preventing short-circuit, it becomes possible to relax the accuracy requirement in positioning the various members of the assembly during the production processes and thus facilitate the production of the membrane-electrode assembly while achieving an expected power generation performance of the membrane-electrode assembly.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
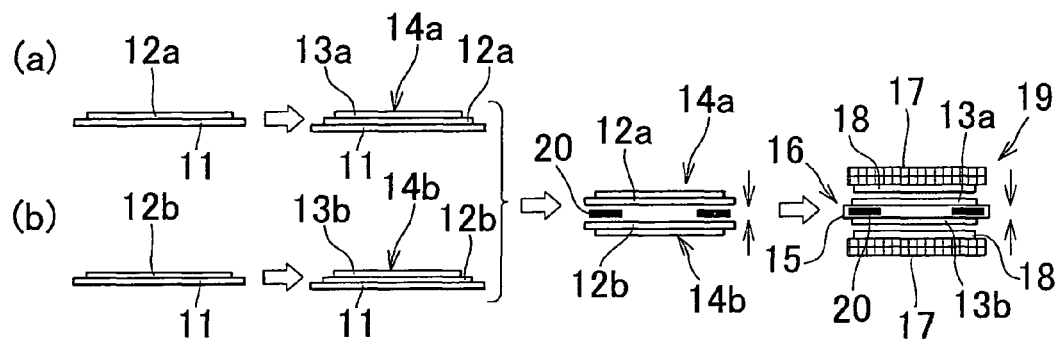
FIG. 1 is a diagram illustrating a first embodiment of the method for producing a membrane-electrode assembly according to the invention.

With reference to FIG. 1 and FIG. 2, a membrane-electrode assembly according to a first embodiment of the production method for the membrane-electrode assembly will be described. In FIG. 1, line (a) shows a line in which a first layered article 14a is formed, and a line (b) shows a line in which a second layered article 14b is formed. In FIG. 1, reference numeral 11 denotes a conveyor sheet. First, on the two lines, an electrolyte resin solution of a predetermined thickness is applied on a conveyor sheet 11 using any suitable technique, and is dried to form a first electrolyte membrane 12a and a second electrolyte membrane 12b. Next, in the line (a), an anode catalyst ink is applied to a predetermined thickness on the first electrolyte membrane 12a and is dried to form an anode catalyst layer 13a. Likewise, in the line (b), a cathode catalyst ink is applied to a predetermined thickness on the second electrolyte membrane 12b and is dried to form a cathode catalyst layer 13b. Subsequently, by removing the conveyor sheet 11, a first layered article 14a in which the first electrolyte membrane 12a and the anode catalyst layer 13a are layered, and a second layered article 14b in which the second electrolyte membrane 12b and the cathode catalyst layer 13b are layered are formed.

The first layered article 14a and the second layered article 14b are then placed so that the electrolyte membranes 12a, 12b of the two articles face each other. A reinforcement frame 20 is disposed between the two articles 14a and 14b, and the entire assembly is then subjected to thermocompression bonding from above and below in a heat press. As a result, the first electrolyte membrane 12a and the second electrolyte membrane 12b are fused and integrated to form an electrolyte membrane in which the reinforcement frame 20 is embedded in the electrolyte membrane 15. Thus, a catalyst coated membrane (CCM) 16 in which the anode catalyst layer 13a and the cathode catalyst layer 13b are layered on both side surfaces of the electrolyte membrane 15 is formed.

An appropriate diffusion layer base material 17 is prepared separately, by applying a water-repellent layer-forming ink and drying the ink to form a porous water-repellent layer 18 on one surface of the diffusion layer base material 17. The diffusion layer base material 17 is layered on an outer side of each of the anode catalyst layer 13a and the cathode catalyst layer 13b. Thus, a membrane-electrode assembly 19 is formed.

Figure 2A:
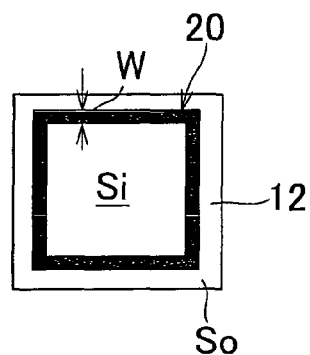
FIGS. 2A and 2B are diagrams illustrating two examples of a reinforcement frame.
Figure 2B:
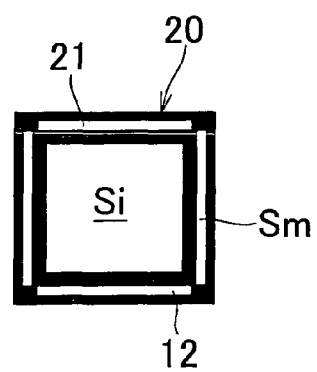

The reinforcement frame 20 may have dimensions that are slightly smaller than those of the electrolyte membrane 12 as shown in FIG. 2A. Alternatively, the reinforcement frame 20 may have dimensions that are substantially the same as those of the electrolyte membranes 12. In either case, interior regions Si of the electrolyte membranes 12 surrounded by the reinforcement frame 20 form the electricity generation region of the membrane-electrode assembly 19. Portions So of the electrolyte membranes 12 that are situated outwardly of the reinforcement frame 20 that is shown in FIG. 2A, or portions Sm of the electrolyte membranes 12 that are exposed in windows 21 formed in the reinforcement frame 20 that is shown in the FIG. 2B fuse and integrate together to stabilize the embedded posture of the reinforcement frame 20 within the electrolyte membrane 15 when the first layered article 14a and the second layered article 14b are integrated by heat fusion.

As shown in FIG. 1, in the membrane-electrode assembly 19, the outer edges of the anode-side catalyst layer 13a and the cathode-side catalyst layer 13b on the opposite surfaces of the electrolyte membrane 15 are located in a region where the reinforcement frame 20 embedded in the membrane-electrode assembly 19 is located. Each side of the reinforcement frame 20 has a width W in a predetermined planar direction. Therefore, even if the outer edge of the anode catalyst layer 13a or the cathode catalyst layer 13b has a positional deviation within the range of the width w, the membrane-electrode assembly 19 can generate the expected amount of electricity. This means that high positional accuracy is not required when forming the catalyst layer 13 on the electrolyte membrane 12 or in disposing the first layered article 14a and the second layered article 14b so that the two articles face each other across the reinforcement frame 20. Thus, the membrane electrode assembly may be easily produced. Besides, ion conduction is less likely to occur on the reinforcement frame 20. Therefore, even if the anode catalyst layer 12a and the cathode catalyst layer 12b are not at positions that accurately coincide with each other in the thickness direction of the electrolyte membrane 15, there is no occurrence of local ion conduction, so that local degradation of the electrolyte membrane 15 may also be avoided. In this respect, too, it becomes possible to relax the positioning accuracy requirement of the catalyst layers 12a, 12b. In addition, the reinforcement of the electrolyte membranes is also enhanced. Furthermore, cross-leaks of gas caused by small penetration pores that may form due to press-attachment of the diffusion layers 18 formed of carbon fiber are prevented simply by using the one reinforcement frame 20.

A second embodiment of the membrane-electrode assembly production method will be described with reference to FIG. 3 and FIG. 4. As the conveyor sheet on one of the line (a) and the line (b) illustrated in FIG. 1, this embodiment uses a long sheet (e.g., polyethylene naphthalate film) 20a made of the same material as the reinforcement frame 20. In the sheet 20a, a plurality of easily breakable lines (score lines) that extend along the shape of reinforcement frames 20 are formed at predetermined intervals. In addition, perforations or sprocket holes 23 may be formed at constant pitches along the two side edges of the sheet 20a.

Figure 3:
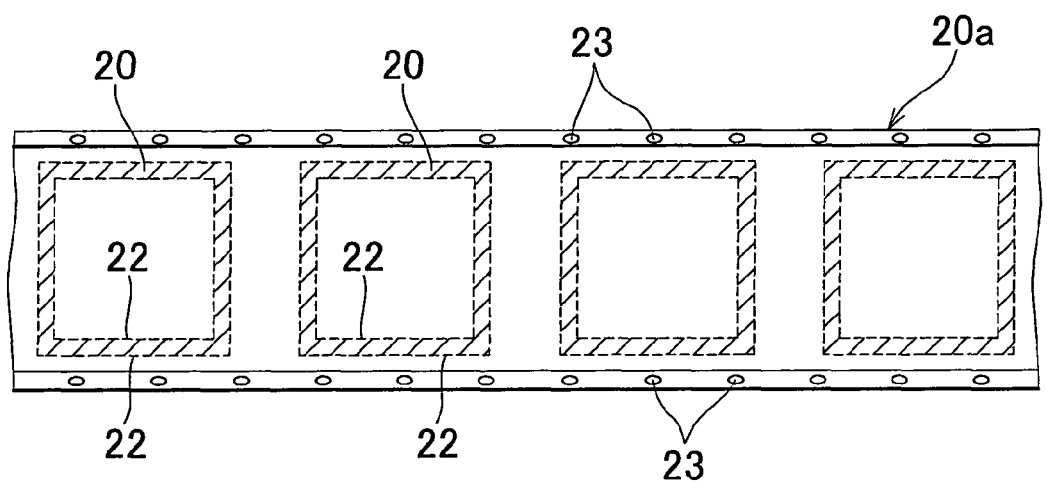
FIG. 3 is a diagram illustrating a conveyor sheet that is used in a second embodiment of the method for producing a membrane-electrode assembly according to the invention.

The same solution as the electrolyte resin solution has been applied beforehand to the regions surrounded by the foregoing easily breakable lines 22 (regions shown by hatching in FIG. 3). Alternatively, an appropriate mold release agent is applied to regions in the sheet 20a that are other than the surrounded regions. Or, both the above applying the electrolyte resin solution and applying mold release agent have been performed beforehand on the sheet 20a.

The long sheet 20a is used as a conveyor sheet, for example, on the line (a), and the first electrolyte membrane 12a and the anode-side catalyst layer 13a are formed on the sheet 20a in the manner as described with reference to FIG. 1. After that, the long sheet 20a is peeled so as to leave the reinforcement frames 20 (the hatched parts in FIG. 3) in first layered articles 14c as shown in FIG. 4. Therefore, after the peeling, first layered articles 14c, in each of which the reinforcement frame 20 separated along the easily breakable lines 22 adheres to the reverse side surface of the electrolyte membrane 12a, as shown in FIG. 4, are formed.

Figure 4:
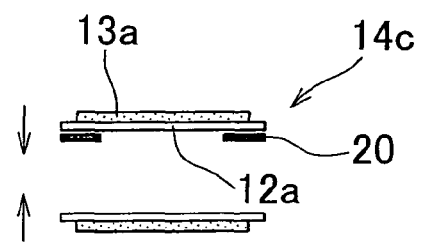
FIG. 4 is a diagram showing a process in producing a membrane-electrode assembly by the second embodiment of the production method.

After the first layered article 14c is placed as shown in FIG. 4 so as to face a second layered article 14b that is produced by the same method as the method employed on the line (b) in FIG. 1, a membrane-electrode assembly 19 is produced in substantially the same manner as described above with reference to FIG. 1. This method omits the process of disposing a separately prepared reinforcement frame 20 between the first layered article 14c and the second layered article 14b that are disposed facing each other. Furthermore, the process of forming the first electrolyte membrane 12a on the long sheet 20a and the process of forming the anode-side catalyst layer 13a on the long sheet 20a may be continuously carried out by continuously feeding the long sheet 20a through the use of the sprocket holes 23 formed in the long sheet 20a.

Figure 5:
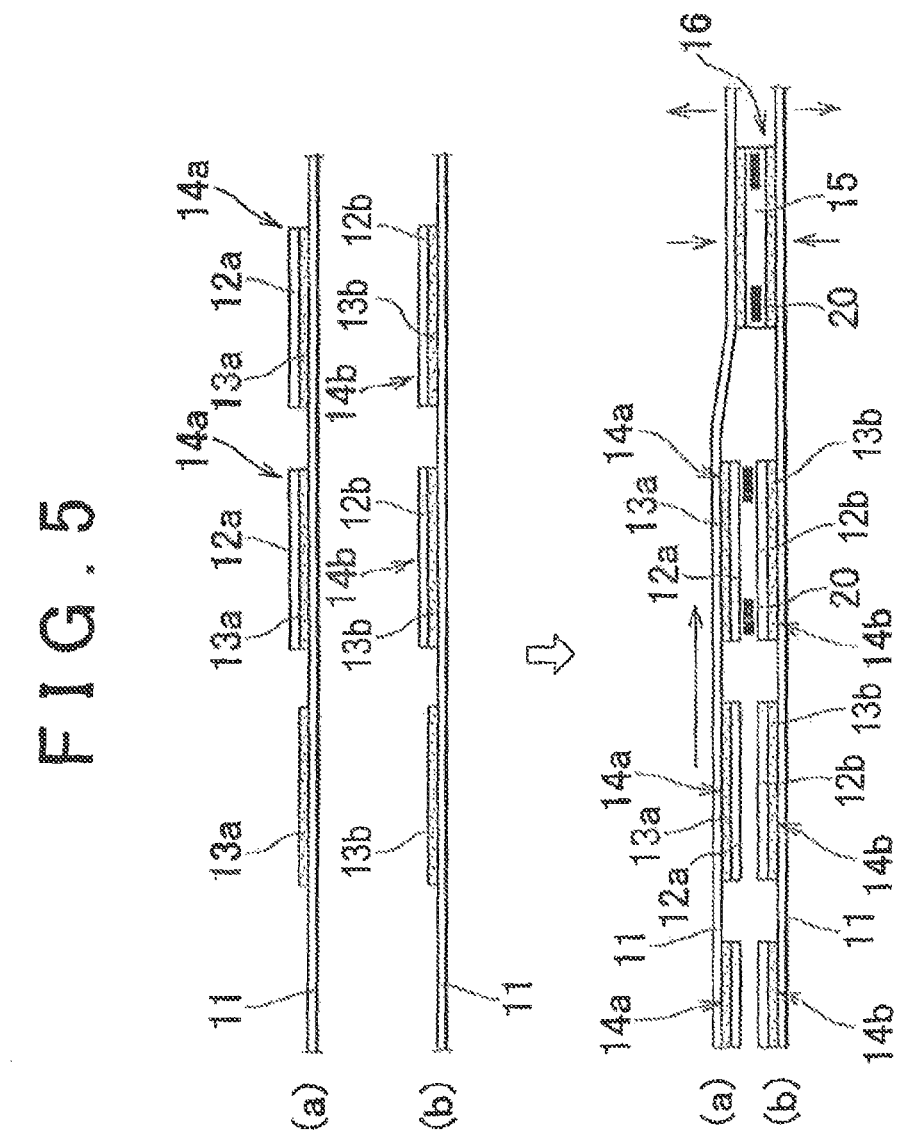
FIG. 5 illustrates a third embodiment of the production method for the membrane-electrode assembly according to the invention.
Figure 6:
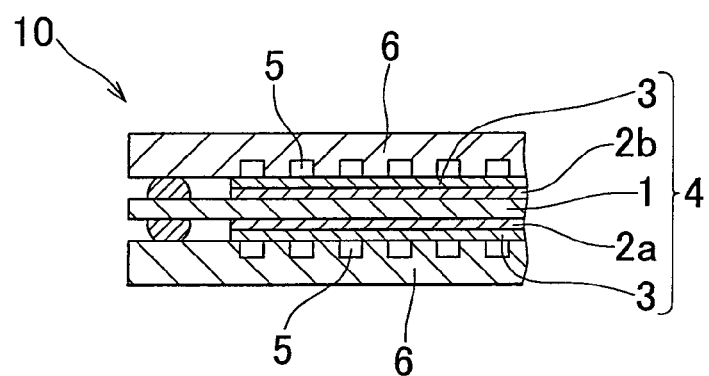
FIG. 6 is a diagram illustrating an example of a solid polymer-type fuel cell.

A third embodiment of the production method of a membrane-electrode assembly will be described with reference to FIG. 5. In this embodiment, on both lines (a) and (b), an anode-side catalyst layer 13a and a cathode-side catalyst layer 13b are firstly formed on conveyance sheets 11 and 11. Then, a first electrolyte membrane 12a and a second electrolyte membrane 12b are formed on the anode-side catalyst layer 13a and the cathode-side catalyst layer 13b, respectively. Thus, first layered articles 14a and second layered articles 14b in each of which the first electrolyte membrane 12a or the second electrolyte membrane 12b is placed at top are continually formed on the conveyance sheets 11 and 11, respectively.

Next, the line (a) is inverted upside down so as to assume a posture of facing the line (b). Therefore, the first layered article 14a and the second layered article 14b on the conveyance sheets 11 and 11 are positioned so that the first electrolyte membrane 12a and the second electrolyte membrane 12b face each other. Then, a reinforcement frame 20 is disposed in substantially the same manner as in FIG. 1 between the first layered article 14a and the second layered article 14b in the mutually facing postures. In the next process, the upper and lower conveyor sheets 11 and 11 are subjected to thermocompression bonding using a heat press or the like. Therefore, the reinforcement frame 20 is embedded within the electrolyte membrane 15 that is formed when the first electrolyte membrane 12a and the second electrolyte membrane 12b are fused and integrated together. Next, by peeling the upper and lower conveyor sheets 11 and 11, the same CCM 16 as described above with reference to FIG. 1 in which the anode-side catalyst layer 13a and the cathode-side catalyst layer 13b are layered on the two side surfaces of the electrolyte membrane 15 is obtained. According to this method, it becomes possible to continually form CCMs 16.

After that, a membrane-electrode assembly 19 is obtained by further layering the diffusion layer base material 17 on the outer sides of the anode-side catalyst layer 13a and the cathode-side catalyst layer 13b in substantially the same manner as shown in FIG. 1.

Membrane thicknesses and the like will be described with reference to examples thereof regarding the foregoing first and second embodiments. It is to be noted that the membrane thickness and the like mentioned below are also applicable to the third embodiment. [1] Polyethylene terephthalate (PET) was adopted as the material of the conveyor sheets 11. On one of the PET-made conveyor sheets 11, an electrolyte resin solution was applied to a thickness of 10 μm, and was dried. On the dried electrolyte resin layer, a catalyst ink for the anode electrode was applied and dried. Then, the conveyance sheet was peeled to obtain a first layered article 14a. The same electrolyte resin solution as mentioned above was applied onto the other conveyor sheet 11 to a thickness of 10 μm, and dried. On the dried electrolyte resin layer, a catalyst ink for the cathode electrode was applied and dried. Then, the conveyor sheet was peeled to obtain a second layered article 14b. [2] Polyethylene naphthalate (PEN) was adopted as the material of the reinforcement frame 20, and a reinforcement frame 20 having a thickness of 12 μm was obtained. [3] The second layered article 14b was placed on a lower heat plate, with the electrolyte membrane-side surface of the article 14b facing upward. Then, a reinforcement frame 20 was placed on the second layered article 14b so as to be within the region of the electrolyte membrane. The first layered article 14a was placed over the top of the reinforcement frame 20, with its electrolyte membrane-side surface facing the reinforcement frame 20, so as to be superposed substantially exactly on the second layered article 14b. [4] A movable upper heat plate was moved closer to the upper surface of the first layered article 14a, and the entire assembly was thermocompression-bonded at a temperature of 140° C., a pressure of 3 MPa, and for 10 to 30 minutes. [5] After pressure was released, a CCM in which the anode catalyst layer and the cathode catalyst layer were layered on the two side surfaces of the electrolyte membrane. Observation of a cross section of the CCM showed that the two electrolyte membranes were fused and integrated together, forming an electrolyte membrane having a thickness of 20 μm. The reinforcement frame was all embedded within the integrated electrolyte membrane.

The invention claimed is:

1. A method for producing a membrane-electrode assembly in which an anode catalyst layer and a cathode catalyst layer are laminated on opposite surfaces of an electrolyte membrane, and in which a reinforcement frame for reinforcement and prevention of short circuits is provided along an outer peripheral portion of the electrolyte membrane, the method comprising:

forming a first layered article in which the anode-catalyst layer is laminated on a first electrolyte membrane, and a second layered article in which the cathode catalyst layer is laminated on a second electrolyte membrane;

laminating the reinforcement frame integrally on the electrolyte membrane of one of the first layered article and the second layered article;

disposing the first layered article and the second layered article so that the first electrolyte membrane and the second electrolyte membrane face each other;

thermocompression-bonding the first layered article and the second layered article that are disposed so as to face each other, so that the reinforcement frame is embedded within the electrolyte membrane that is formed by the first electrolyte membrane and the second electrolyte membrane being fused and integrated together, wherein the first layered article and the second layered article are formed by peeling from a conveyance sheet a laminate that is formed by applying an electrolyte membrane-forming resin and a catalyst layer-forming resin onto the conveyance sheet, and the reinforcement frame is integrally laminated on the electrolyte membrane of one of the first layered article and the second layered article by transferring part of the conveyance sheet, in a shape as the reinforcement frame, to the electrolyte membrane when the laminate is peeled from the conveyance sheet.

\* \* \* \* \*